United States Patent
Saruwatari et al.

(10) Patent No.: US 6,727,949 B1
(45) Date of Patent: *Apr. 27, 2004

(54) IMAGE PICKUP APPARATUS WITH MOVING IMAGE AND STILL IMAGE FOCUS CONTROL BASED ON CHANGING THRESHOLD VALUE

(75) Inventors: Hiroshi Saruwatari, Kanagawa-ken (JP); Takashi Fujii, Kanagawa-ken (JP); Yoshiyuki Mizoguchi, Kanagawa-ken (JP); Toshinobu Yamaguchi, Tokyo (JP); Taro Murakami, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/762,929

(22) Filed: Dec. 10, 1996

Related U.S. Application Data

(63) Continuation of application No. 08/313,325, filed on Sep. 27, 1994, now abandoned.

(30) Foreign Application Priority Data

Sep. 29, 1993 (JP) .............................................. 5-265798

(51) Int. Cl.$^7$ .............................................. H04N 5/252
(52) U.S. Cl. ...................................... 348/349; 348/354
(58) Field of Search ................................. 348/207, 220, 348/221, 345, 349, 362, 363, 364, 221.1, 220.1, 207.99; H04N 5/232

(56) References Cited

U.S. PATENT DOCUMENTS

| | | | | |
|---|---|---|---|---|
| 4,714,963 A | * | 12/1987 | Vogel | 348/220 |
| 4,739,411 A | * | 4/1988 | Bolton | 348/221.1 |
| 4,837,628 A | * | 6/1989 | Sasaki | 348/220 |
| 4,881,127 A | * | 11/1989 | Isoguchi et al. | 348/371 |
| 5,276,563 A | * | 1/1994 | Ogawa | 348/220 |
| 5,526,046 A | * | 6/1996 | Kondo | 348/220.1 |
| 6,385,393 B1 | * | 5/2002 | Ohta | 348/345 |

FOREIGN PATENT DOCUMENTS

| | | |
|---|---|---|
| JP | 04-369184 | 12/1992 |
| JP | 05-236310 | 9/1993 |

* cited by examiner

*Primary Examiner*—Tuan Ho
(74) *Attorney, Agent, or Firm*—Robin, Blecker & Daley

(57) ABSTRACT

In an image pickup apparatus which permits switching between a moving-image shooting mode and a still image shooting mode and is provided with an automatic focusing device for focus adjustment by detecting a high frequency component of a video signal to use it as a focus evaluating signal, the focusing action of the automatic focusing device is arranged to be restarted when the moving-image shooting mode is switched to the still-image shooting mode.

38 Claims, 11 Drawing Sheets

IMAGE PICKUP APPARATUS WITH MOVING IMAGE AND STILL IMAGE FOCUS CONTROL BASED ON CHANGING THRESHOLD VALUE

This is a continuation application under 37 CFR 1.62 of prior application Ser. No. 08/313,325, filed Sep. 27, 1994 now abandonded.

BACKGROUND OF THE INVENTION

1. Field of the Invention

This invention relates to an image pickup apparatus, such as a video camera or the like, having an automatic focusing device and arranged to permit selection between a moving-image shooting mode and a still-image shooting mode.

2. Description of the Related Art

The automatic focusing device included in a video camera or the like is arranged to control a focusing action on the basis of a video signal coming from an image sensor for accurate focusing, to permit setting a focus detecting area as desired and to prevent focus variations and occurrence of a parallax from being caused by zooming, The automatic focusing device can be simply arranged with no special sensor additionally provided for focusing.

FIG. 1 shows in a block diagram the arrangement of the conventional automatic focusing device of the above-stated kind. Referring to FIG. 1, a light signal obtained by a focusing lens 1 from an object of shooting is imaged on an image sensor 2 disposed to the rear of the focusing lens 1. A video signal is outputted from the image sensor 2. A luminance signal obtained from the video signal is inputted to a band-pass filter 3 which is connected to the image sensor 2. The band-pass filter 3 extracts from the luminance signal a predetermined high frequency component which varies according to the state of focus. The high frequency component is inputted to a detection circuit 4 which is connected to the band-pass filter 3. The detection circuit 4 detects the amplitude of the high frequency component inputted (integrated). The result of the detection is taken out as a focus detection signal. The focus detection signal is inputted to a gate circuit 5 which is connected to the detection circuit 4. The gate circuit 5 extracts from the focus detection signal only a portion of the focus detection signal obtained from a focus detecting area set within an image plane. The focus detection signal thus extracted through the gate circuit 5 is inputted to an evaluation value computing circuit 6 which is connected to the gate circuit 5. The evaluation value computing circuit 6 computes either the integrated value or the differentiated value of the focus detection signal for each field to obtain a focus evaluating signal for the current field. To the evaluation value computing circuit 6 is connected an in-focus decision circuit 8 which is arranged to decide an in-focus state. A lens control circuit 9 is connected to the in-focus decision circuit 8 and is arranged to control the position of the focusing lens 1. A motor 12 which is arranged to drive the focusing lens 1 is connected to the lens control circuit 9 through a lens driving circuit 10. To the motor 12 is connected a lens position detecting circuit 11 which detects the position of the focusing lens 1. The lens position detecting circuit 11 is connected to the lens control circuit 9. A memory 7 is connected to the in-focus decision circuit 8 and the lens control circuit 9.

The automatic focusing device which is arranged in the above-stated manner performs a focusing action in accordance with a so-called hill-climbing method. At the start of the focusing action, an optical path length is varied, for example, by slightly vibrating the focusing lens 1 or the image sensor 2 in the direction of an optical axis. The in-focus decision circuit 8 computes the direction in which a defocused state takes place by detecting changes in a focus evaluating signal. Then, the lens driving circuit 10 drives the motor 12 to cause the focusing lens 1 to be moved in the direction in which the focus evaluating signal becomes larger. In this case, the focusing lens 1 is moved in one and the same direction as long as the focus evaluating signal of the current field is judged to be larger than the focus evaluating signal of a preceding field. The largest value of the focus evaluating signals obtained up to now and the position of the focusing lens 1 obtained when the focus evaluating signal is at the largest value are stored in the memory 7. Further, even when the focus evaluating signal of the current field is judged to be smaller than the focus evaluating signal of the preceding field, if the focus evaluating signal of the current field is larger than a predetermined percent of the maximum value of the focus evaluating signal obtained up to that time, the focusing lens is driven in the same direction. If the focus evaluating signal becomes smaller than the predetermined percent, the focusing lens is regarded as having passed over an in-focus point and the driving direction of the focusing lens 1 is reversed. Then, the focusing lens is moved to the lens position corresponding the maximum value of the focus evaluating signal stored in the memory 7, so that the focusing action is completed. The in-focus decision circuit 8 generates a coincidence signal when the focus evaluating signal obtained from the focusing lens 1 which is reversely moved comes to coincide with the largest value of the focus evaluating signal stored in the memory 7. In response to the coincidence signal, the lens control circuit 9 issues a stop instruction to bring the focusing lens 1 to a stop.

FIG. 2 is a graph showing the characteristic of a relation obtained between the position of the focusing lens and the focus evaluating signal. The peak value Vf of the focus evaluating signal which is obtained when the lens is judged to be in an in-focus state is stored in the memory 7. Even after the focusing action is completed and the focusing lens is stopped, the focus evaluating signal continues to be detected. If the focus evaluating signal becomes smaller than a restart threshold value Vth, the movement of the focusing lens is restarted. Accordingly, the restart threshold value Vth is determined in a predetermined ratio to the peak value Vf. The focusing accuracy can be increased by having the restart threshold value Vth set at a high level. If the restart threshold value Vth is set at a high level, however, the focusing, action would be restarted even when the luminance of the object of shooting slightly changes or even when another object happens to move past the object. In such a case, the image plane fluctuates to give a disagreeable impression in viewing the video image. Thus, in the video camera, the continuity of video images is regarded as more important than the momentary image quality (focusing and exposure). To prevent the focusing action from being unnecessarily restarted in such a manner, therefore, the restart threshold value Vth is set in consideration of the diameter of an allowable circle of confusion of the image pickup system of the video camera. Unless the focus evaluating signal obtained during shooting becomes smaller than the restart threshold value Vth, the motor 12 is stopped to keep the focusing lens 1 to its position (an in-focus point) obtained when the peak value Vf which is stored in the memory 7 is obtained.

Further, in the video camera, the iris is set in such a manner to make the responsivity relative to a change of brightness slow. Therefore, a change of the picked-up image is made moderate with respect to a sudden change of brightness, so that the brightness of the image is stabilized.

The automatic focusing device used for the conventional video camera is arranged as described above. Meanwhile, there has been proposed a video camera which is arranged to be capable of operating not only in a moving-image shooting mode but also in a still-image shooting mode in which a shot of a still image can be taken and to permit switching between these two modes.

In the moving-image shooting mode, the focus is continuously adjusted until an in-focus state is attained. However, in the moving-image shooting mode, since the continuity of video images is regarded as more important than the accuracy of focusing, the video camera of the above-stated kind is arranged to continue a shooting operation and keep the focusing lens stopped even in an out-of-focus state as long as the focus evaluating signal is not found to be smaller than the restart threshold value Vth. In other words, the restart threshold value Vth is set as low as possible to give priority to the continuity of video images. On the other hand, in an ordinary still-image-dedicated shooting camera, importance is attached to a momentary high quality of an image taken in. Therefore, no exposure is allowed with the lens out of focus. A shutter release is made only after an in-focus state is attained.

In shooting moving images, therefore, importance is attached to the continuity of video images and, if the amount of blur of the images is about the same as the diameter of an allowable circle of confusion, the focusing action is not restarted. The stopped position of the focusing lens in shooting moving images is not always a position at which the peak value of the focus evaluating signal is obtained.

In the event of shooting a still image, since importance is attached to a momentary image quality, it is necessary to have a main object of shooting approximately in the middle of the depth of field and to have about the same amount of blur in front and in rear of the main object. Further, in order to avoid any out-of-focus shooting for obtaining a high quality image, any defocused state caused by an error of the stopping position of the focusing lens must be minimized. It is, therefore, preferable to make a shutter release with the focusing lens in a position corresponding to the peak value of the focus evaluating signal.

Therefore, it has been necessary for the video camera of the kind arranged to permit switching between a moving-image shooting mode and a still-image shooting mode either to have two focusing devices arranged separately for the moving-image shooting mode and the still-image shooting mode or to have one focusing device arranged in common for both of the shooting modes at the expense of quality of its focusing characteristic of one of these shooting modes. In other words, in the latter case, the video camera of the above-stated kind has been arranged not to restart the focusing action unless the value of the focus evaluating signal becomes less than the restart threshold value Vth even in the still-image shooting mode.

With the focusing action arranged to be carried out in the hill climbing method mentioned above, the focusing accuracy depends on the aperture value of the image pickup system, i.e., on the depth of field. When the aperture value (F-number) is large (when the size of the aperture of the iris is small), the hill-like shape of the focus evaluating signal (shown in FIG. 2) becomes gently sloping near the in-focus position. The depth of focus becomes deeper to make detection of the peak point of the focus evaluating signal difficult and to lower the focusing accuracy. Further, when the aperture value (F-number) becomes larger, i.e., when the size of the aperture of the iris becomes smaller, the quantity of incident light decreases to lower the value of the focus evaluating signal. The focusing accuracy decreases under such a condition as it becomes difficult to detect an in-focus point like in the case of shooting a low luminance object. More specifically, as the aperture value (F-number) is smaller, i.e., when the size of the aperture of the iris is larger, the depth of field becomes shallower, so that focus detection can be more accurately performed. Accordingly, the hill-climbing AF action has a maximum accuracy when the iris is fully opened. In the event of a low focusing accuracy, the conventional automatic focusing device has been arranged to carry out automatic focusing with aperture values set according to shooting conditions.

In the video camera arranged as described above to be capable of having the moving-image shooting mode and the still-image shooting mode, the restart threshold value Vth is set to be used in common for both the moving-image shooting mode and the still-image shooting mode. It is, therefore, sometimes hardly possible to have an optimum focusing accuracy in each of these shooting modes. For example, in carrying on shooting by switching the moving-image shooting mode over to the still-image shooting mode, when the amount of blur obtained immediately before the end of shooting in the moving-image shooting mode is within the range of allowable values determined by the restart threshold value Vth, the shooting comes to be performed in the still-image shooting mode under the same condition without performing the focusing action again. The quality of a still image thus obtained becomes the same as the image quality obtained in the moving-image shooting mode. In such a case, the focusing accuracy is too low for a still image and gives a low image quality.

In the video camera mentioned above, an in-focus state is accurately attainable in the still-image shooting mode, if the focusing action is performed by setting the aperture value (F-number) at a small value (making the size of the aperture of the iris large) for accurately setting a focusing condition to make the peak position of the focus evaluating signal easily detectable. However, it is difficult to employ such a method, because, in the moving-image shooting mode in which video images are to be continuously picked up, the quantity of light apposite to the focusing action often does not coincide with the quantity of light apposite to shooting and recording.

SUMMARY OF THE INVENTION

This invention is developed in view of the problems in the video camera of the kind mentioned in the foregoing. It is, therefore, an object of this invention to provide a video camera which permits selection of a shooting mode from between moving-image shooting and still-image shooting, has an automatic focusing device and is capable of enhancing the quality of still images obtained in the still-image shooting mode.

To attain this object, an image pickup apparatus arranged as a preferred embodiment of this invention includes switching means for switching between a moving-image shooting mode and a still-image shooting mode, automatic focusing means for carrying out a focusing action by detecting a high frequency component of a video signal as a focus evaluating signal and by driving an image pickup system on the basis of the focus evaluating signal, and restart means for restarting the focusing action by controlling the automatic focusing means when the moving-image shooting mode is switched to the still-image shooting mode by the switching means.

An image pickup apparatus which is arranged as another preferred embodiment of this invention includes switching means for switching between a moving image shooting mode and a still-image shooting mode, automatic focusing means for carrying out a focusing action by detecting a high frequency component of a video signal as a focus evaluating signal and by driving an image pickup system on the basis of the focus evaluating signal, and control means for changing over a characteristic of the focusing action of the automatic focusing means correspondingly with the moving-image shooting mode or the still-image shooting mode selected through the switching by the switching means.

An image pickup apparatus which is arranged as a further preferred embodiment of this invention to use, in common, a focusing device for both a moving-image shooting mode and a still-image shooting mode includes switching means for switching between the moving-image shooting mode and the still-image shooting mode, automatic focusing means for carrying out a focusing action by detecting a high frequency component of a video signal as a focus evaluating signal and by driving an image pickup system on the basis of the focus evaluating signal, and control means for controlling exposure control means in such a way as to have an iris almost fully opened when the focusing action is performed in the still-image shooting mode and to have the iris changed over to a required aperture value when a shot is taken in the still-image shooting mode after completion of the focusing action. With the apparatus arranged in this manner, when the moving image shooting mode is switched to the still-image shooting mode by the switching means, the focusing action is restarted by the restart means. A high frequency component of the video signal is detected as the focus evaluating signal. Then, the focusing action is again carried out by driving the image pickup system on the basis of the focus evaluating signal.

Further, when the shooting mode of the video camera is switched by the switching means which permits selection between the moving-image shooting mode and the still-image shooting mode, threshold value switching means changes over a focusing restart threshold value correspondingly with the shooting mode selected by the switching means. When the high frequency component detected as the focus evaluating signal becomes less than the changed-over focusing restart threshold value, the focusing action is restarted by driving the image pickup system.

Further, when the still-image shooting mode is selected by the switching means which permits selection between the moving-image shooting mode and the still-image shooting mode, the control means causes the iris to be set approximately at a full open position when the focusing action is performed in the still-image shooting mode and, when a shot is taken in the still-image shooting mode after completion of the focusing action, causes the iris to be changed over to a required aperture value.

The above and other objects and features of this invention will become apparent from the following detailed description of embodiments thereof taken in connection with the accompanying drawings.

DETAILED DESCRIPTION OF THE PREFERRED EMBODIMENTS

First Embodiment

Figure 3:
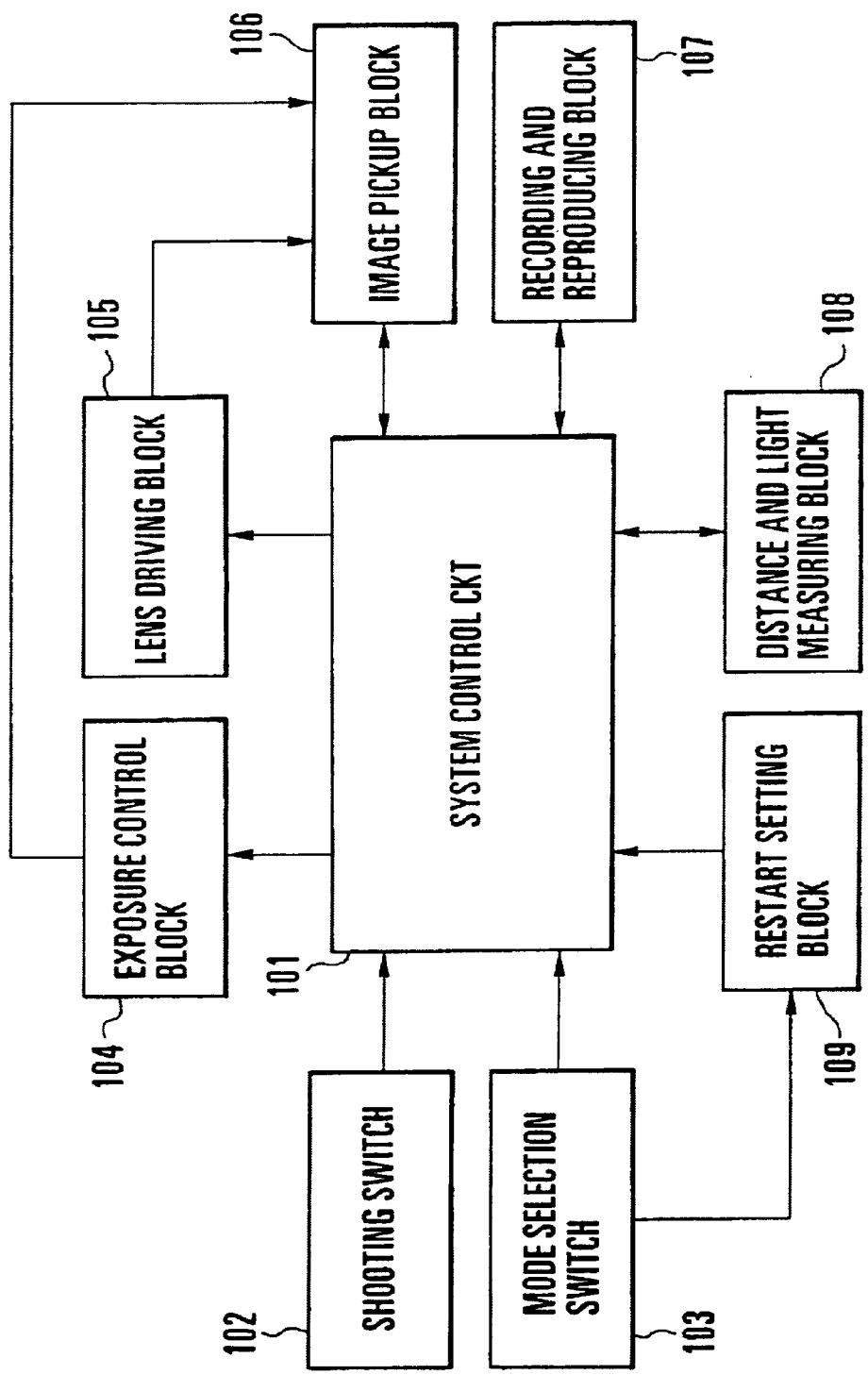
FIG. 3 is a block diagram showing the basic arrangement of a first embodiment of this invention.

A first embodiment of this invention is first described with reference to FIGS. 3 to 7 as follows: FIG. 3 shows in a block diagram the arrangement of the first embodiment. FIG. 7 shows in a graph the characteristic of a restart of the focusing action of the first embodiment through a relation obtained between the position of a focusing lens and a focus evaluating signal.

Referring to FIG. 3, a system control circuit 101 is composed of a microcomputer and is arranged to control the actions of the whole apparatus. To the system control circuit 101 are connected a shooting switch 102 arranged to be operated for a start of shooting, a mode selection switch 103 arranged to permit selection between a moving-image shooting mode and a still-image shooting mode, a restart setting block 109 arranged to allow a focusing action to be restarted when the moving-image shooting mode is switched to the still-image shooting mode by the mode selection switch 103, a distance and light measuring block (evaluating block) 108 arranged to perform distance and light measuring actions and compute an evaluation value of the focus condition and an evaluation value of the exposure condition, a recording and reproducing block 107 arranged to record and reproduce images picked up, an image pickup block 106 provided with a focusing lens, an iris, an image sensor, etc., and arranged to perform an image pickup action, a lens driving block 105 arranged to drive the focusing lens disposed in the image pickup block 106, and an exposure control block 104 arranged to control an exposure by driving the iris disposed in the image pickup block 106.

With the first embodiment arranged in this manner, the system of the embodiment is initialized when a power supply switch which is not shown is turned on. The mode selection switch 103 is then checked for its state of selection. If the moving-image shooting mode is found to have been selected, a check is made to find if the shooting switch 102 is in an on-state. If so, the system control circuit 101 instructs the distance and light measuring block (evaluating block) 108 to perform its distance and light measuring actions and compute the evaluation values of the focus and exposure conditions. The system control circuit 101 then instructs the lens driving block 105 to drive the focusing lens and the exposure control block 104 to perform exposure control. The image pickup block 106 performs its image pickup action. The data of images thus picked up is stored in the recording and reproducing block 107. If the shooting switch 102 is found to be in an off-state, the system is set in a standby state to wait for recording.

In a case where the still-image shooting mode is selected by the mode selection switch 103, when the shooting switch 102 is turned on, the system control circuit 101 instructs the distance and light measuring block (evaluating block) 108 to perform the distance and light measuring actions. The lens driving block 105 then drives the focusing lens and the exposure control block 104 performs exposure control on the basis of the output of the distance and light measuring block (evaluating block) 108. After that, the system control circuit 101 confirms the condition of focusing. The system control circuit 101 instructs the lens driving block 105 to drive the focusing lens as necessary. Upon confirmation of an in-focus state, the focusing lens driving action is brought to a stop. A shutter release is made. A still image is picked up. The data of the picked-up image is stored in the recording and reproducing block 107.

Next, the details of arrangement of these basic blocks are described with reference to FIG. 4 as follows.

Figure 1:
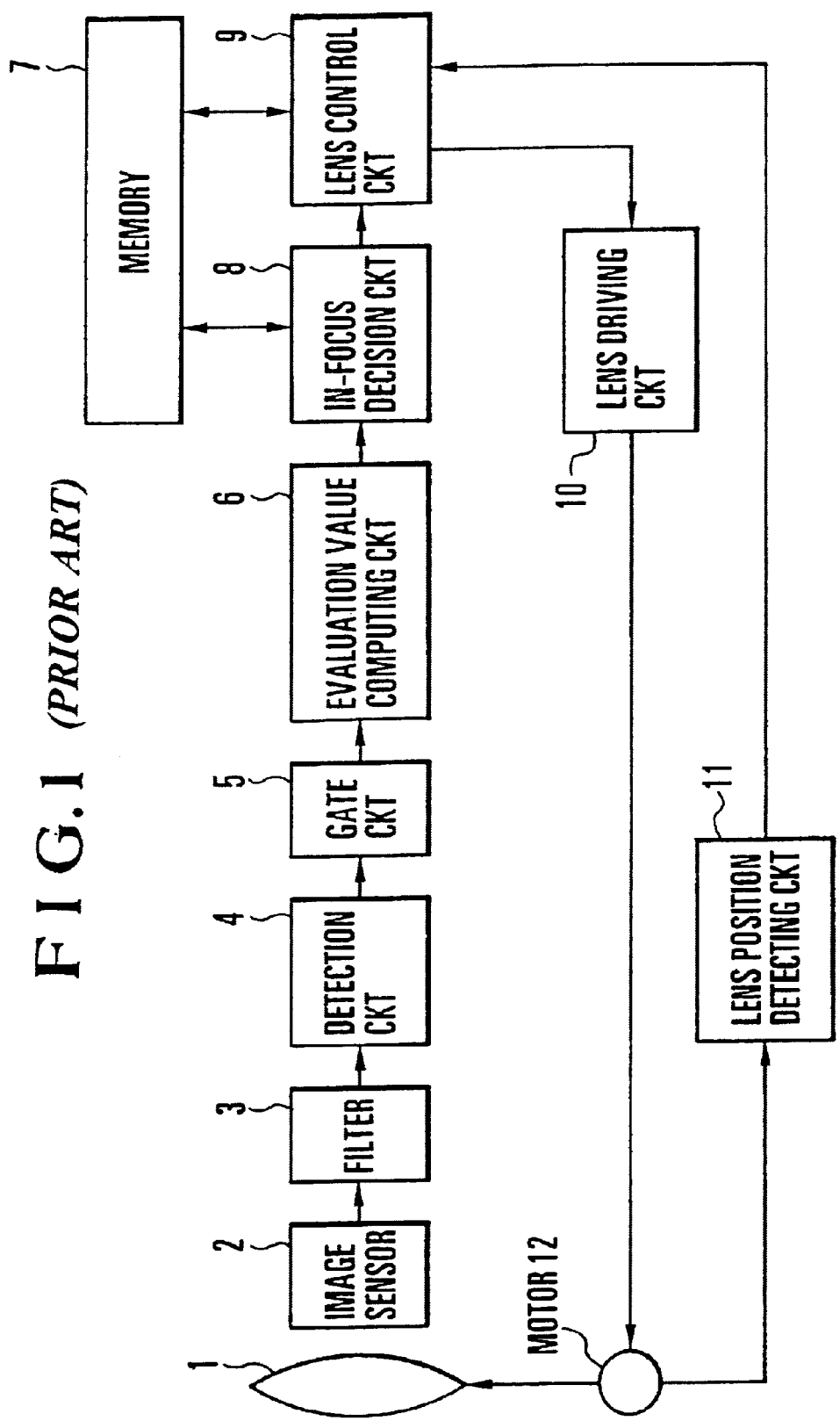
FIG. 1 is a block diagram showing a general arrangement of an automatic focusing device.
Figure 4:
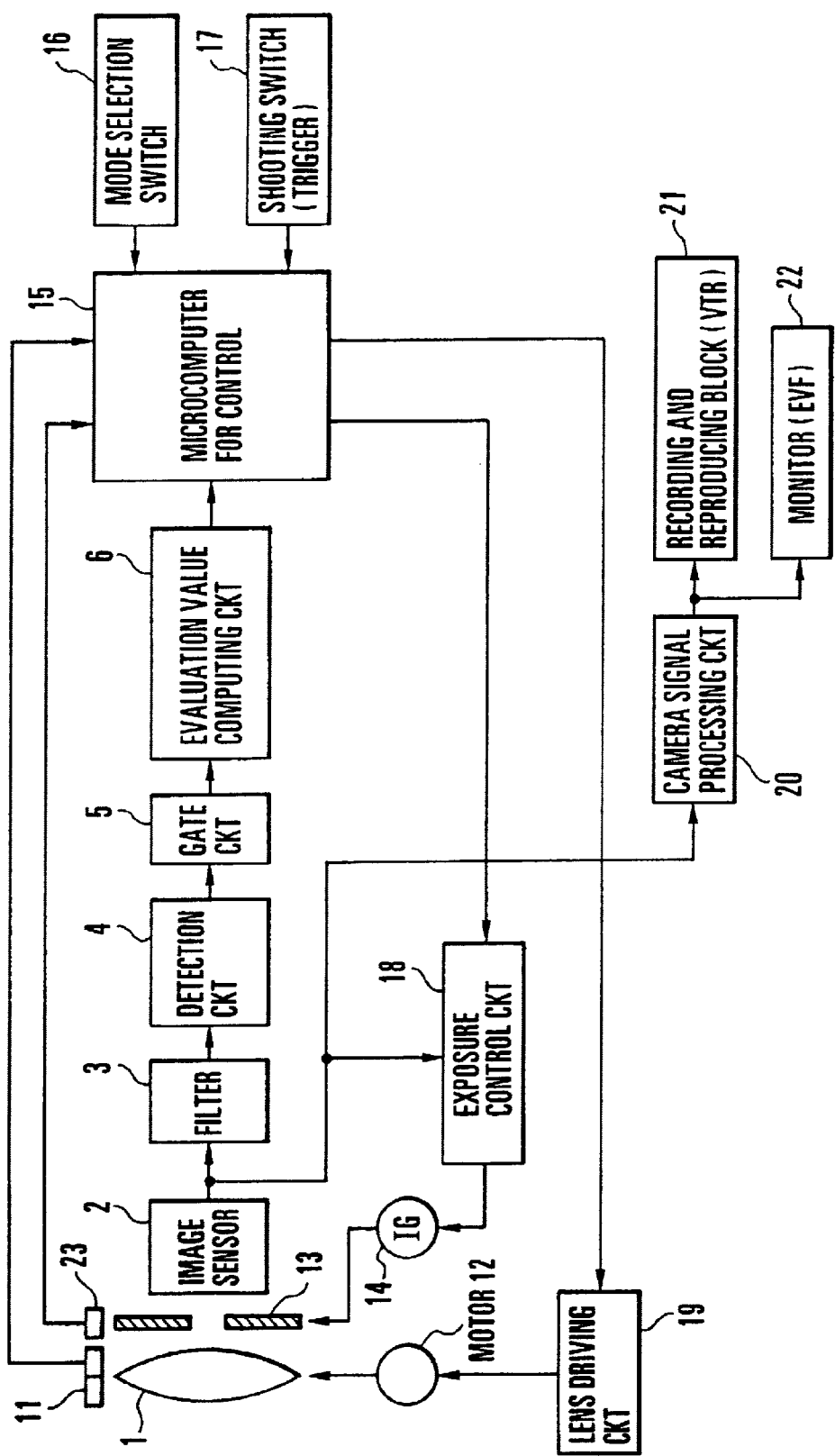
FIG. 4 is a block diagram showing the details of arrangement of the first embodiment of this invention.

In FIG. 4, the same component parts as those shown in FIG. 1 are indicated by the same reference numerals and the details of them are omitted from the following description. Referring to FIG. 4, an iris 13 is disposed to the rear of a focusing lens 1. An image sensor 2 is arranged to output a video signal. The video signal is integrated in a predetermined cycle by an exposure control circuit 18. The aperture of the iris 13 is controlled by opening and closing it in such a way as to make the level of an average value of the integrated video signal constant. Under this control action, the average level of the video signal is kept constant.

The value of the aperture of the iris 13 is detected by an aperture encoder 23. The aperture value thus detected is supplied to a control microcomputer 15 to be used in computing the depth of field. A light flux is obtained through the focusing lens 1 and the iris 13 and falls on the image sensor 2. The image sensor 2 photo-electrically converts the light flux into a video signal. The video signal is supplied to a filter 3, a detection circuit 4 and a gate circuit 5 to have the level of a high frequency component of the video signal extracted. The level of the high frequency component extracted is inputted to an evaluation value computing circuit 6. For example, the evaluation value computing circuit 6 obtains, from this input, a peak hold value for every field. The peak hold value is outputted as a focus evaluating signal.

The focus evaluating signal is supplied to the control microcomputer 15. The control microcomputer 15 then computes the direction and the speed of driving the focusing lens 1. Then a motor 12 is driven through a lens driving circuit 19 according to the result of computation.

The control microcomputer 15 controls not only the focusing action but also the whole system of the video camera. Either a moving-image shooting mode or a still-image shooting mode is selected according to the operated state of a mode selection switch 16. The focus control characteristics such as a focusing restart threshold value, an in-focus state detecting condition and a lens driving speed are varied according to the shooting mode selected. A shooting action is carried out when the shooting switch 17 which is a trigger button is detected as having been operated. Further, the control characteristic of an exposure control circuit 18 is also controlled by the control microcomputer 15, for example, by varying the response characteristic and speed of the iris 13, etc., according to the shooting mode selected.

The video signal outputted from the image sensor 2 is also supplied to a camera signal processing circuit 20 to be converted into a standard TV signal. The video signal thus standardized is supplied to a recording and reproducing block 21 which consists of a video recorder, etc. The standardized video signal is arranged to be monitored by supplying it also to a monitor 22 which is, for example, an electronic viewfinder or the like.

Figure 5:
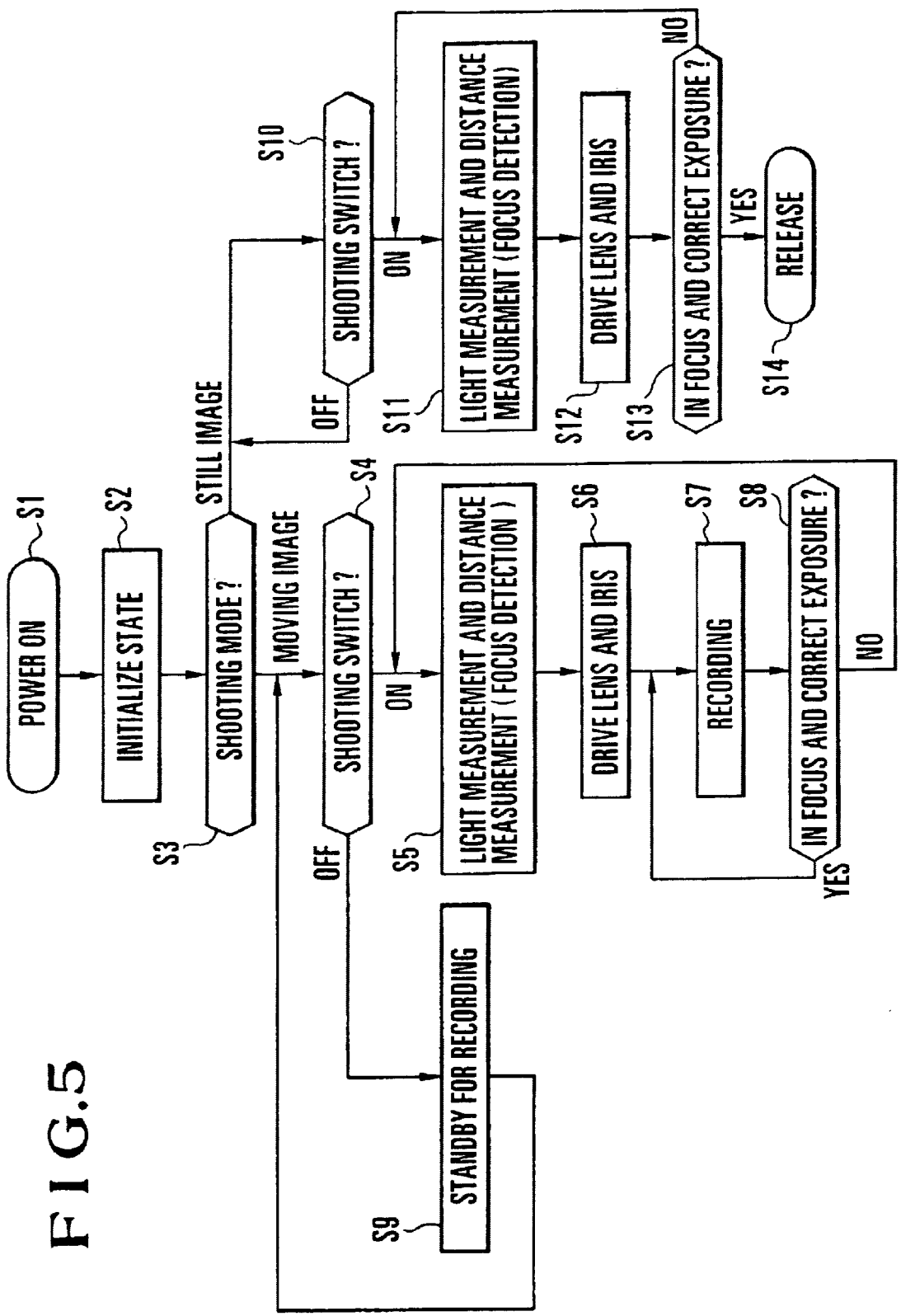
FIG. 5 is a flow chart showing a basic operation of a video camera which permits selection between a moving-image shooting mode and a still-image shooting mode.

A video camera of the kind having an automatic focusing method applied thereto and arranged to permit selection between the moving-image shooting mode and the still-image shooting mode performs its basic operation in a manner as described below with reference to FIG. 5 which is a flow chart.

Figure 2:
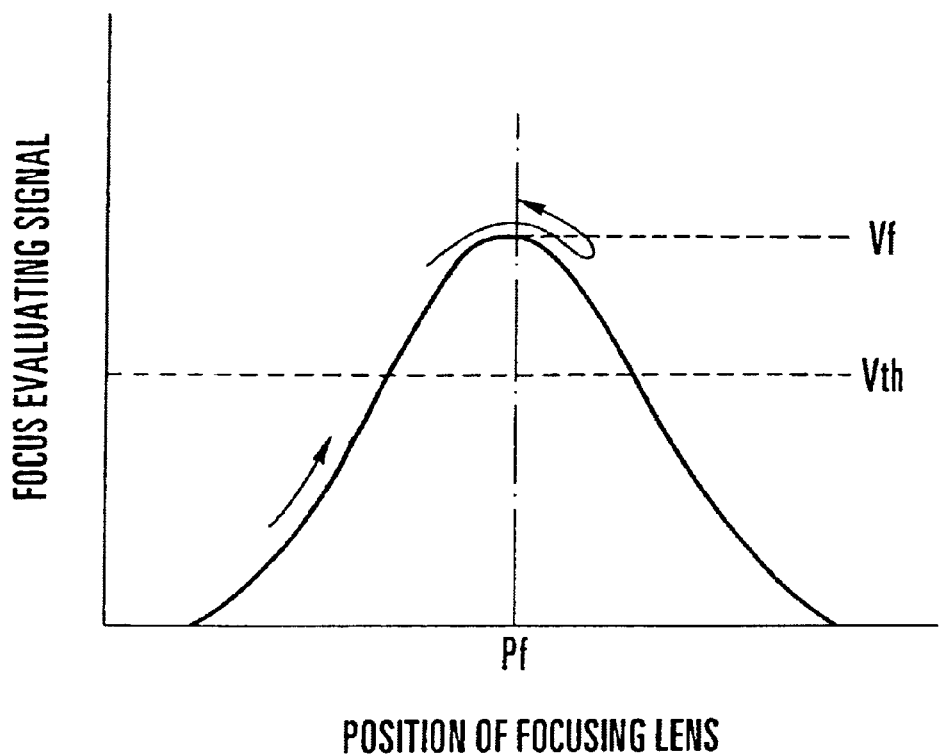
FIG. 2 is a graph showing the characteristic of the focusing action of the automatic focusing device of FIG. 1 through a relation between the position of a focusing lens and a focus evaluating signal.

At a step S1, a power supply switch is turned on. The flow of operation proceeds to a step S2 to initialize the state of the video camera. At a step S3, a check is made for the shooting mode of the video camera. If the shooting mode is found to be the moving-image shooting mode, the flow of operation comes to a step S4. At the step S4, a check is made to find if the shooting switch is in an on-state. If not, the flow comes to a step S9 to stand by for recording. If so, the flow comes to a step S5 to initiate a focusing action. At the step S5, a light measuring process, a distance measuring (focus detecting) process and a computing process for the focus and exposure evaluation values are executed. At a step S6, the focusing lens is driven and the iris is set at an aperture position on the basis of the focus and exposure evaluation values computed at the step S5, then, terminating the focusing and exposure adjusting action. The flow then comes to a step S7. At the step S7, recording begins. At a step S8, a check is made to find if an in-focus state is attained and if a correct exposure is attained, by computing the focus evaluation value and the exposure evaluation value for every field even during recording. If not, the flow comes back to the step S5 to resume the focusing and exposure adjusting action. If so, the flow comes back to the step S7 to continue the recording process and keep the focusing lens stopped, as importance is attached to the continuity of video images in the moving-image shooting mode, so long as the focus evaluating signal is not judged to be smaller than the restart threshold value Vth as shown in FIG. 2. Further, when a correct exposure is not attained at the step S8, the flow also comes back to the step S5 to perform the focus and exposure adjusting action.

If the shooting mode is found to be the still-image shooting mode at the step S3, the flow comes to a step S10. At the step S10, a check is made to find if the shooting switch is in an on-state. If so, the flow comes to a step S11 to initiate a focusing action. At the step S11, a light measuring process, a distance measuring (focus detecting) process and a computing process for the focus evaluation value and the exposure evaluation value are executed. At a step S12, the focusing lens is driven and the aperture is set, then, terminating the focusing and exposure adjusting action. At a step S13, a check is made to find if an in-focus state and a correct exposure are attained. If not, no exposure is allowed, as importance is attached to the momentary high quality of an image in the still-image shooting mode. If so, the flow comes to a step S14 to effect a shutter release.

In the moving-image shooting mode, importance is attached to the continuity of video images as mentioned in the foregoing. Therefore, if the amount of blur is about the same as the diameter of an allowable circle of confusion, the focusing action is not restarted. The stopping position of the focusing lens in the moving-image shooting mode does not always corresponds to the peak value of the focus evaluating signal. In the still-image shooting mode in which importance is attached to the momentary quality of images, on the other hand, the image quality is severely evaluated. A main object of shooting must be at about the middle point of the depth of field. The amounts of blur obtained before and after the main object must be about equal to each other. Further, in order to take a shot of a high quality still image by minimizing any defocused state due to an error of the stopping position of the focusing lens to avoid an out-of-focus shooting, a shutter release is preferably made with the focusing lens set in a position corresponding to a peak value of the focus evaluating signal.

The following describes in detail the operation of the first embodiment and, particularly, its operation to be performed when the moving-image shooting mode is switched to the still-image shooting mode.

In the case of the first embodiment, when the position of the mode selection switch 103 is shifted from a moving-image shooting mode position to a still-image shooting mode position, the system control block 101 shown in FIG. 3 instructs the restart setting block 109 to have the focusing action restarted irrespective as to whether an in-focus state has been attained immediately before switch-over from the moving-image shooting mode. As mentioned above, even if the lens is decided to be in an in-focus state just before the switch-over from the moving-image shooting mode to the still-image shooting mode, the stopping position of the focusing lens does not always coincide with the peak position of the focus evaluating signal, although the amount of blur is within the permissible range determined by the restart threshold value Vth for the moving-image shooting mode. In view of this, the embodiment is arranged such that, even in a case where the position of the focusing lens obtained immediately before switch-over from the moving-image shooting mode to the still-image shooting mode is at a point Pm and the focus evaluating signal is at a higher level than a restart threshold value Vm, as shown in FIG. 7, and the focusing lens is stopped with an in-focus state determined to be attained, a focusing action is restarted without fail to be carried out through a sequence of processes of the so-called hill climbing method. Hence, when a shutter release is made, the focusing lens is at a position close to a focusing lens position Pf which corresponds to the peak value of the focus evaluating signal. Therefore, the amount of blur obtained at the time of shooting becomes much smaller than the amount of blur obtained immediately after the switch-over from the moving-image shooting mode to the still-image shooting mode.

Incidentally, in a case where the shooting mode is switched from the still-image shooting mode to the moving-image shooting mode, the focusing action is never restarted unless the value of the focus evaluating signal is lower than the predetermined threshold Vm shown in FIG. 7.

The first embodiment is thus arranged to have the restart setting block 109 shown in FIG. 3 cause the focusing action to be restarted without fail when the mode selection switch 103 is shifted from the moving-image shooting mode position to the still-image shooting mode position in process of shooting. This arrangement enables the embodiment to always accurately accomplish the focusing action for still-image shooting, so that still images can be picked up with a high image quality.

The flow of processes to be executed by the control microcomputer 15 in the first embodiment of this invention is described in detail below with reference to FIG. 6 which is a flow chart.

The shooting switch of the first embodiment is assumed to consist of a moving-image shooting trigger switch and a still-image shooting trigger switch.

Figure 6:
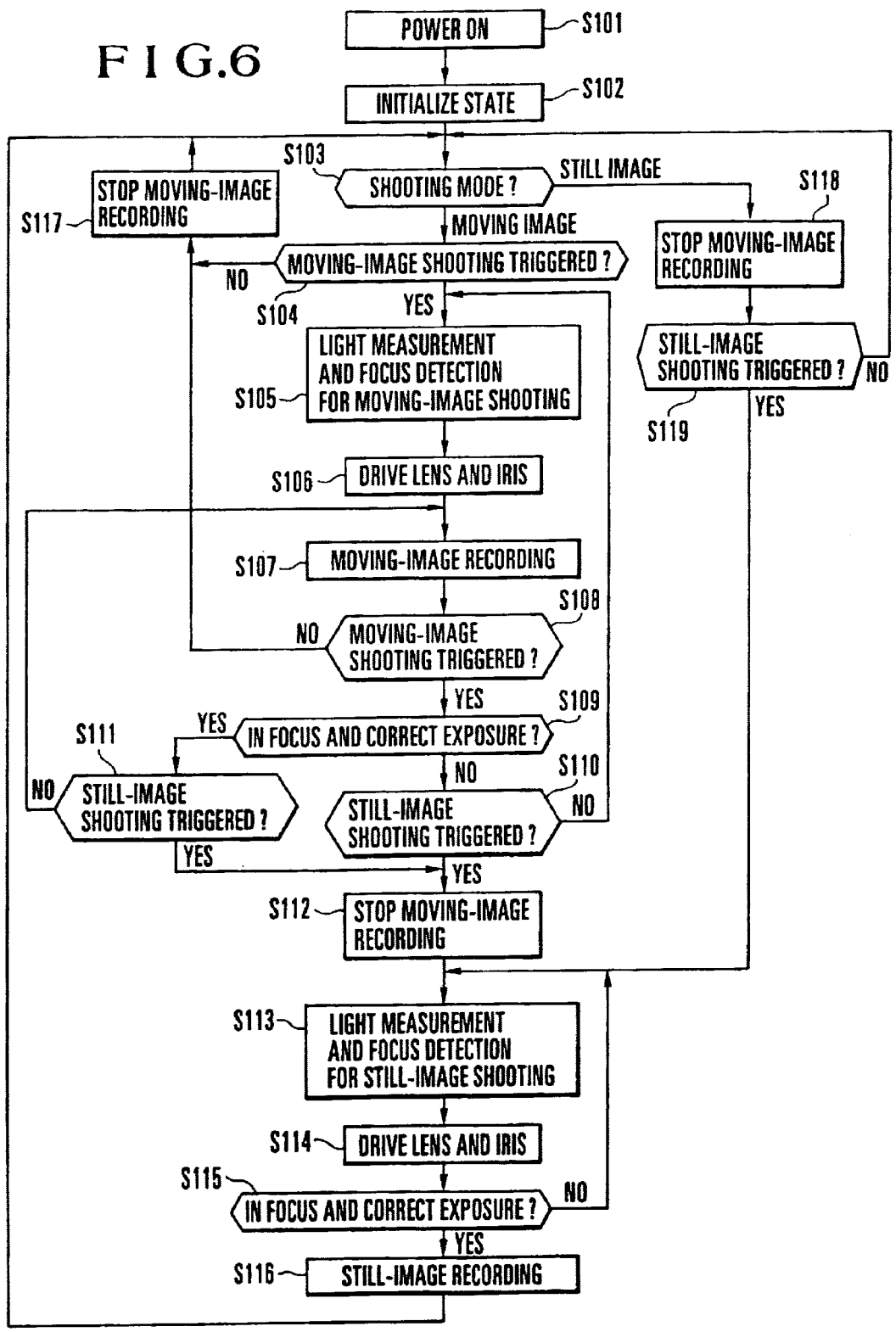
FIG. 6 is a flow chart showing the operation of the first embodiment of this invention.
Figure 7:
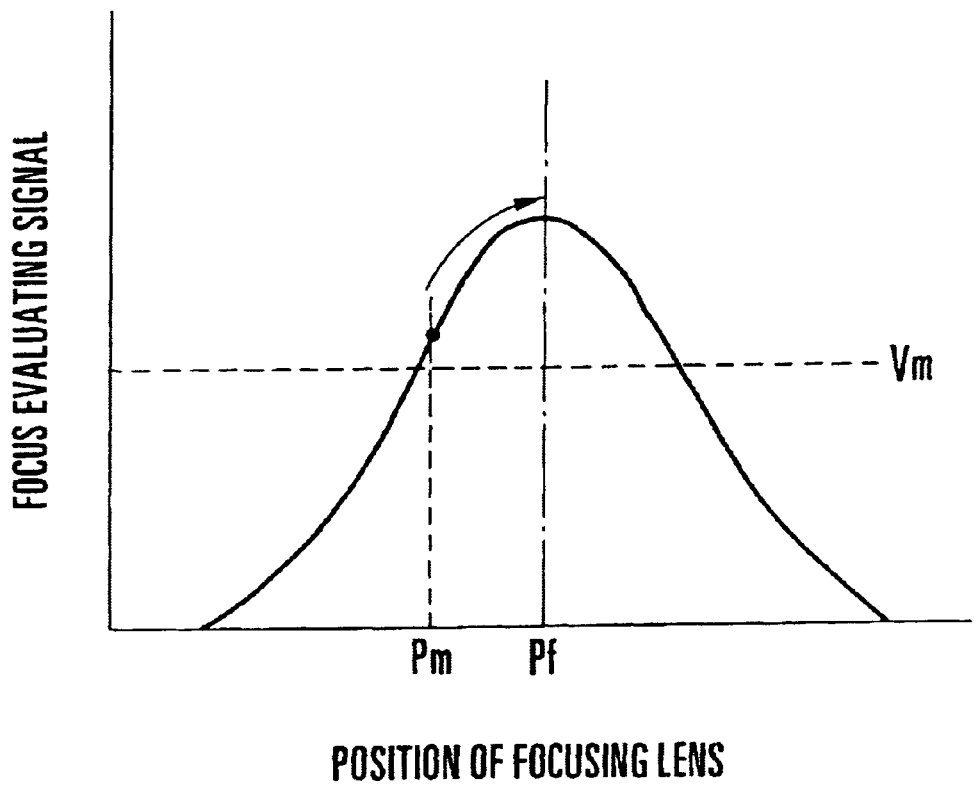
FIG. 7 is a graph showing the characteristic of the operation of the first embodiment of this invention through a relation between the position of a focusing lens and a focus evaluating signal.

Referring to FIG. 6, the flow of processes of the control microcomputer 15 begins when a power supply is turned on at a step S101. At a step S102, the state of the whole system of the video camera is initialized. At a step S103, the operating state of the mode selection switch 16 is checked for the shooting mode selected.

If the shooting mode is found to be the moving-image shooting mode at the step S103, the flow comes to a step S104. At the step S104, a check is made for the state of the shooting switch 17, i.e., the moving-image shooting trigger switch which is arranged to cause the moving image shooting to begin. The flow waits until it is confirmed that the moving-image shooting trigger switch is pushed. If the moving-image shooting trigger switch is not operated, the flow comes to a step S117 to stop the moving-image shooting and comes back to the step S103.

When the moving-image shooting trigger switch is pushed, the flow comes to a step S105. At the step S105, light measuring and focus detecting actions and computing actions for the focus and exposure evaluation values for the moving-image shooting are performed. At a step S106, the iris 13 and the focusing lens 1 respectively begin to be driven. At a step S107, the recording and reproducing block 21 begins to perform a recording action on moving images. At a step S108, a check is made for the operating state of the moving-image shooting trigger switch. If the moving-image shooting trigger switch is found to have been released from the state of being operated, the flow comes to the step S117 to stop the moving-image shooting and then comes back to the step S103.

If the moving-image shooting trigger switch is found at the step S108 to have been operated, the flow comes to a step S109. At the step S109, a check is made for an in-focus state (by using a restart threshold value set for the moving-image shooting mode). If no in-focus state is found to have been attained, the flow comes to a step S11. At the step S11, a check is made for the state of the still-image shooting trigger switch. If the still-image shooting trigger switch is found not pushed, the flow comes back to the step S105 to continue the light measuring and focus detecting actions and computing actions for the focus and exposure evaluation values, so that the focusing lens and the iris are controlled. In this instance, the moving-image shooting of course continues.

If the lens is found to be in an in-focus state at the step S109, the flow comes to a step Sill to make a check for the state of the still-image shooting trigger switch. If the still-image shooting trigger switch is found not pushed, the flow comes back to the step S107 to continue the moving-image shooting with the lens left in the in-focus state.

If the still-image shooting trigger switch is found at the step S110 or Sill to have been pushed, this indicates that an instruction is given for the still-image shooting. Then, the flow comes to the step S112. At the step S112, the moving-image shooting is brought to a stop and the flow proceeds to a step S113. At the step S113, a light measuring action, a focus detecting action and computing actions for the focus and exposure evaluation values for the still-image shooting are performed.

The light measuring and focus detecting actions for the still-image shooting differ from the characteristics of the actions performed in shooting moving images. In detecting the focus, the restart threshold value and a threshold value used in deciding an in-focus state are changed to severer values in the still-image shooting mode. A focusing lens driving speed is also changed. In carrying out exposure control, an iris driving speed, an integrating time constant, a response speed, etc., are also changed to permit instantaneous detection at a higher speed.

At a step S114, the iris 13 and the focusing lens 1 are actually driven. At a step S115, a check is made to find if an in-focus state is attained. If not, the flow comes back to the step S113 to continue the exposure control and the focusing action until an in-focus state is attained. If an in-focus state is found to have been attained, the flow comes to a step S116. At the step S116, the still-image recording is carried out. The flow then comes back to the step S103.

Further, if the shooting mode is found to be the still-image shooting mode at the step S103, the flow comes to a step S118 to execute a process for bringing the moving-image recording to a stop. At a step S119, a check is made for the operating state of the still-image shooting trigger switch. If the still-image shooting trigger switch is found to have been operated, the flow comes to the step S113 to carry out light measuring and focus detecting actions and computing actions for the focus and exposure evaluation values for the still-image shooting. The processes subsequent to the step S113 are performed in the same manner as has been described above.

With the check made for the state of the still-image shooting trigger switch at the step S119, if the still-image shooting trigger switch is found not operated, the flow comes back to the step S103.

The processes described above enable the first embodiment to change the characteristics of the focus detecting and aperture control actions to characteristics suited for the still-image shooting and to restart the control actions when the moving-image shooting mode is switched to the still-image shooting mode, irrespective as to whether an in-focus state has been obtained at the time of switch-over. Therefore, exposure control and focus detection can be accurately carried out for the still-image shooting.

Second Embodiment

Figure 8:
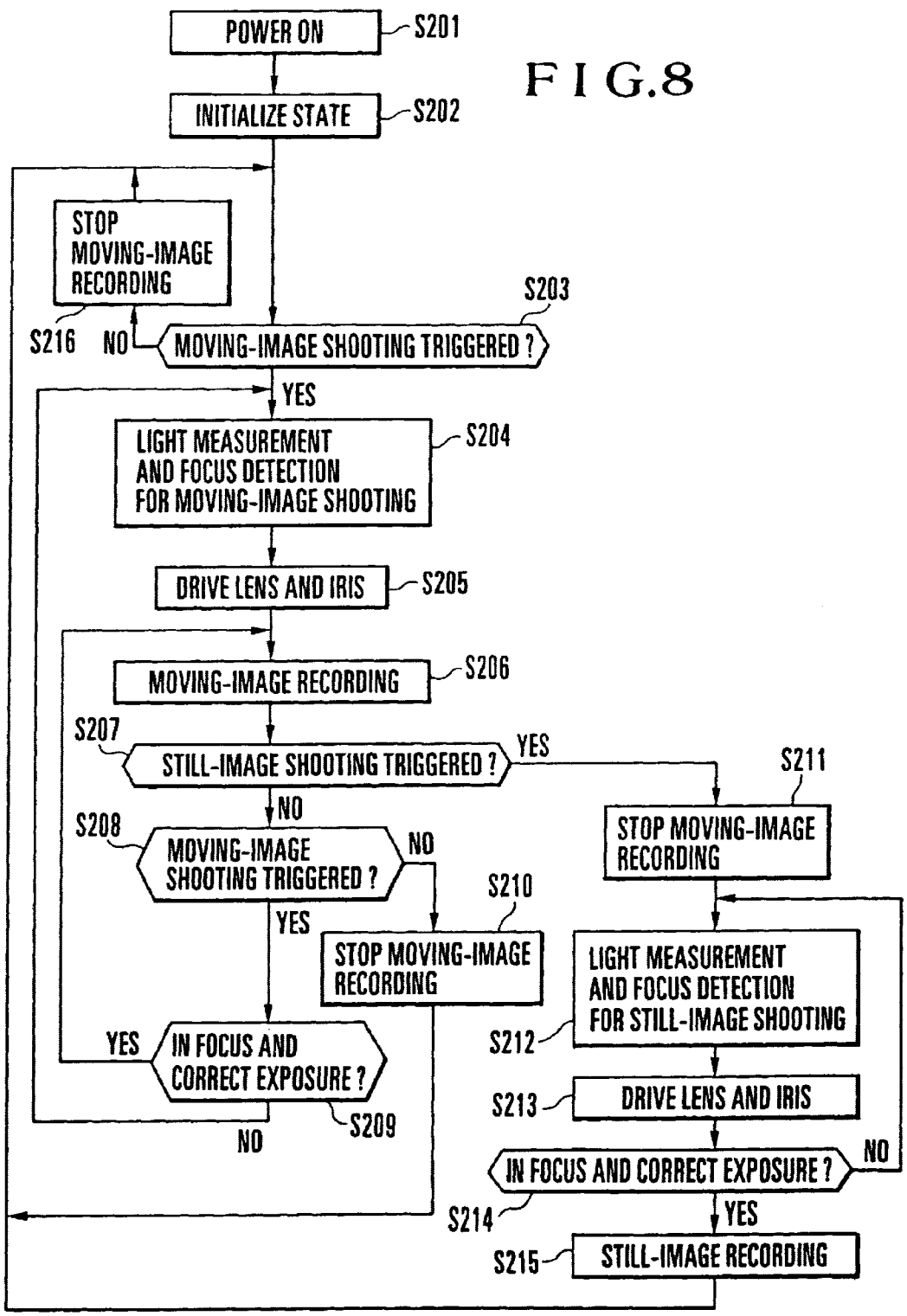
FIG. 8 is a flow chart showing the operation of a second embodiment of this invention.

The following describes a second embodiment of this invention referring to a flow chart shown in FIG. 8.

The second embodiment does not have any switch for selection between the moving-image shooting mode and the still-image shooting mode and is arranged to allow the moving-image shooting mode to normally have priority and to perform the still-image shooting at an arbitrary timing while the moving-image shooting is in process. With the exception of this, the second embodiment is arranged in the same manner as the first embodiment.

Referring to FIG. 8, the flow of processes begins when a power supply is turned on at a step S201. At a step S202, the state of the whole system of the video camera is initialized. At a step S203, a check is made for the operating state of the shooting switch 17, i.e., the trigger switch for the moving-image shooting. The flow waits until the pushing operation on the shooting switch 17 is confirmed. If the moving-image shooting trigger switch is found not operated, the flow comes to a step S216 to execute a process for bringing the moving-image recording to a stop. The flow then comes back to the step S203.

When the moving-image shooting trigger switch is pushed, the flow comes to a step S204. At the step S204, light measuring and focus detecting actions and computing actions for the focus and exposure evaluation values for the moving-image shooting are carried out. At a step S205, the iris 13 and the focusing lens 1 respectively begin to be driven. At a step S206, the recording and reproducing block 21 is allowed to begin a recording action on moving images. At a step S207, a check is made for the state of the still-image shooting trigger switch. If the still-image shooting trigger switch is found not pushed, the flow comes to a step S208 to find if the moving-image shooting trigger switch has been pushed. If not, the flow comes to a step S210 to execute a process for bringing the moving-image shooting to a stop. The flow then comes back to the step S203.

If the moving-image shooting trigger switch is found to have been turned on at the step S208, the flow comes to a step S209 to make a check for an in-focus state. If the in-focus state is found to have been attained, the flow comes to the step S206 to have the moving-image recording continued. If not, the flow comes back to the step S204 to perform the light measuring and focus detecting actions and computing actions for the focus and exposure evaluation values and adjust the focusing lens and the iris until an in-focus state is attained for the moving-image shooting. In this instance, the moving-image shooting is of course performed.

If the still-image shooting trigger switch is found at the step S207 to have been turned on, it means that an instruction has been given for the still-image shooting. The flow then comes to a step S211 to bring the the moving-image recording to a stop. At a step S212, light measuring and focus detecting actions and computing actions for the focus and exposure evaluation values for the still-image shooting are performed. The characteristics of these actions differ from those of the actions performed for the moving-image shooting. In detecting the focus in the still-image shooting mode, the restart threshold value and the threshold value used for deciding an in-focus state are changed to severer values than in the moving-image shooting mode. The focusing lens driving speed is also changed. In performing exposure control in the still-image shooting mode, the characteristics of an iris driving speed, an integrating time constant, a response speed, etc., are also changed to make a high-speed and instantaneous detection possible.

At a step S213, the iris 13 and the focusing lens 1 are actually driven. At a step S214, a check is made to find if an in-focus state has been attained. If not, the flow comes back to the step S212 to have the exposure control and the focusing action continue until an in-focus state is attained. If so, the flow comes to a step S215 to have the still-image recording carried out. The flow then comes back to the step S203.

These actions enable the second embodiment to permit the still-image shooting at an arbitrary timing while the moving-image shooting is in process. In that instance, the still-image recording is carried out by bringing the process of the moving-image recording to a stop. After completion of the still-image recording, there is obtained a standby state. In the case of a shift of the shooting mode from the moving-image shooting mode to the still-image shooting mode, the exposure and focusing actions are controlled to be restarted after the light measuring and focus detecting characteristics for the moving-image shooting is changed over to the light measuring and focus detecting characteristics for the still-image shooting, irrespective as to whether or not an in-focus state has already been obtained in the moving-image shooting mode before the shift of the shooting mode.

Third Embodiment

A third embodiment of this invention is next described with reference to a flow chart shown in FIG. 9 as follows. The third embodiment is provided with no switch for switching selection between a moving-image shooting mode and a still-image shooting mode. The moving-image shooting mode normally has priority. The still-image shooting mode is allowed to take place at an arbitrary timing while the moving-image shooting is in process. A recording medium or recording areas to be used for the still-image shooting are arranged separately from those to be used for the moving-image shooting. The embodiment is thus arranged such that the still-image shooting can be accomplished without bringing the moving-image shooting to a stop. With the exception of this, the third embodiment is arranged in the same manner as the first embodiment.

Figure 9:
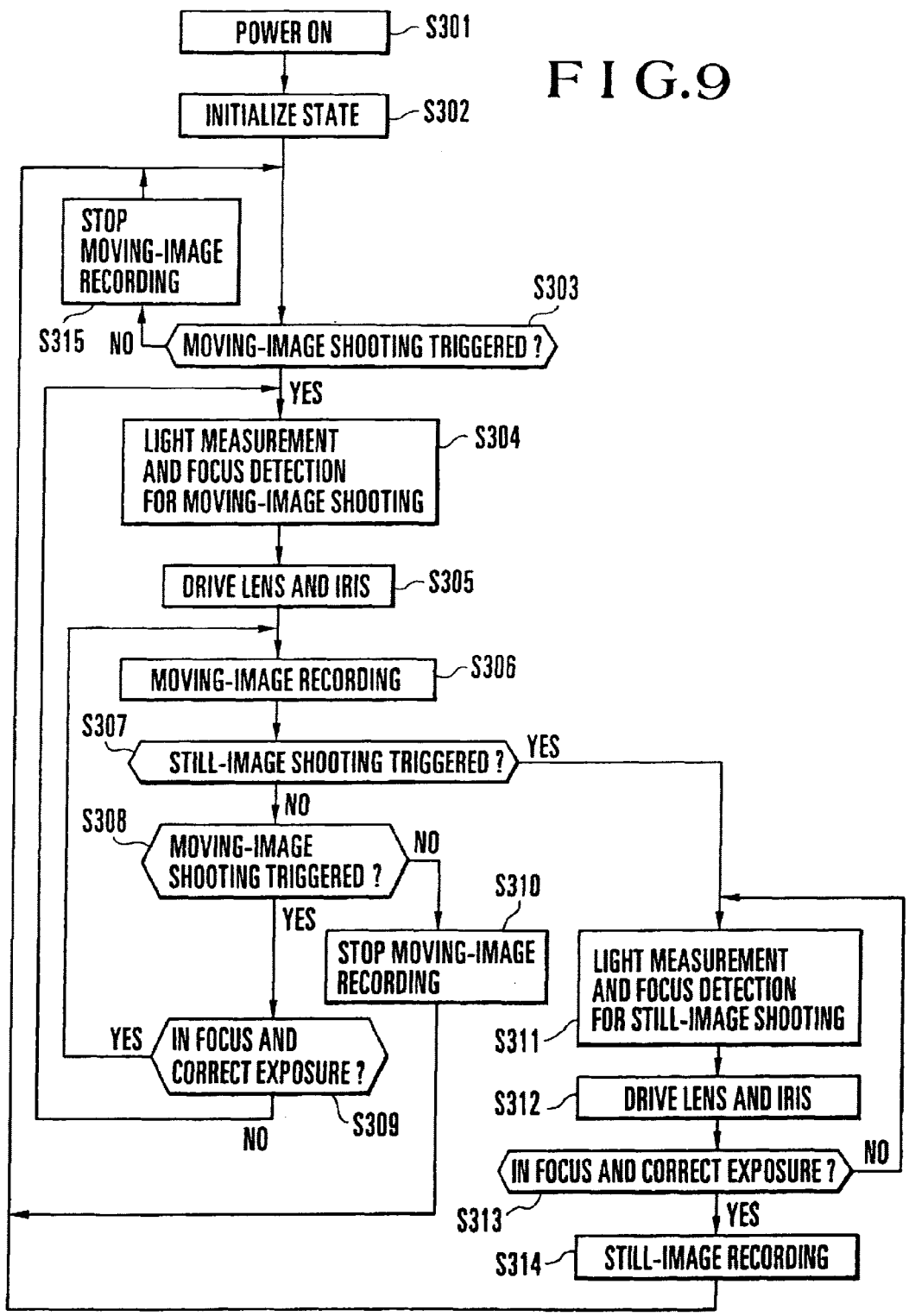
FIG. 9 is a flow chart showing the operation of a third embodiment of this invention.

Referring to the flow chart of FIG. 9, at a step S301, the flow of processes begins when a power supply is turned on. At a step S302, the whole system of the video camera is initialized. At a step S303, a check is made for the operating state of the shooting switch 17, i.e., a moving-image shooting trigger switch. The flow waits until confirmation of the pushing of the shooting switch 17. If the moving-image shooting trigger switch is not operated, the flow comes to a step S315 to execute a process for bringing the moving-image recording to a stop and then comes back to the step S303.

When the moving-image shooting trigger switch is found to have been pushed, the flow comes to a step S304. At the step S304, light measuring and focus detecting actions and computing actions for the focus and exposure evaluation values for the moving-image shooting are performed. At a step S305, the iris 13 and the focusing lens 1 begin to be driven. At a step S306, the recording and reproducing block 21 is allowed to begin to record moving images. At a step S307, a check is made to find if the still-image shooting trigger switch has been pushed. If not, the flow comes to a step S308. At the step S308, a check is made to find if the moving-image shooting trigger switch has been operated. If not, the flow comes to a step S310 to bring the moving-image recording to a stop and comes back to the step S303.

If the moving-image shooting trigger switch is found at the step S308 to have been operated, or turned on, the flow comes to a step S309. At the step S309, a check is made for an in-focus state. If the in-focus state is found to have been attained, the flow comes to the step S306 to allow the moving-image recording to continue. If not, the flow comes back to the step S304 to perform the light measuring and focus detecting actions and computing actions for the focus and exposure evaluation values for the moving-image shooting and adjust the focusing lens and the iris until an in-focus state is attained. In this instance, the moving-image shooting of course continues.

If the still-image shooting trigger switch is found at the above-stated step S307 to have been turned on, the flow proceeds to a step S311 as it means that an instruction for the still-image shooting has been issued. At the step S311, light measuring and focus detecting actions for the still-image shooting are performed. The light measuring and focus detecting actions for the still-image shooting differ in characteristic from the actions for the moving-image shooting. In detecting the focus for the still-image shooting, the restart threshold value is changed to severer values than for the moving-image shooting. The focusing lens driving speed is also changed. Further, in controlling an exposure for the still-image shooting, the characteristics of control, such as an iris driving speed, an integrating time constant, a response speed, etc., are also changed for high-speed and instantaneous detection.

At a step S312, the iris 13 and the focusing lens 1 are actually driven. At a step S313, a check is made to find if an in-focus state has been obtained. If not, the flow comes back to the step S311 to continue the exposure control and focus adjusting actions until an in-focus state is attained. If so, the flow comes to a step S314 to have the still-image recording carried out. If not, the flow comes back to the step S303.

In a case where the shooting mode shifts from the moving-image shooting mode to the still-image shooting mode, the characteristics of the light measuring and focus detecting actions are changed to the characteristics suited for the still-image shooting before the exposure and focus control actions are restarted, irrespective as to whether an in-focus state has been attained in the moving-image shooting mode at the time of the shift.

Fourth Embodiment

Figure 10:
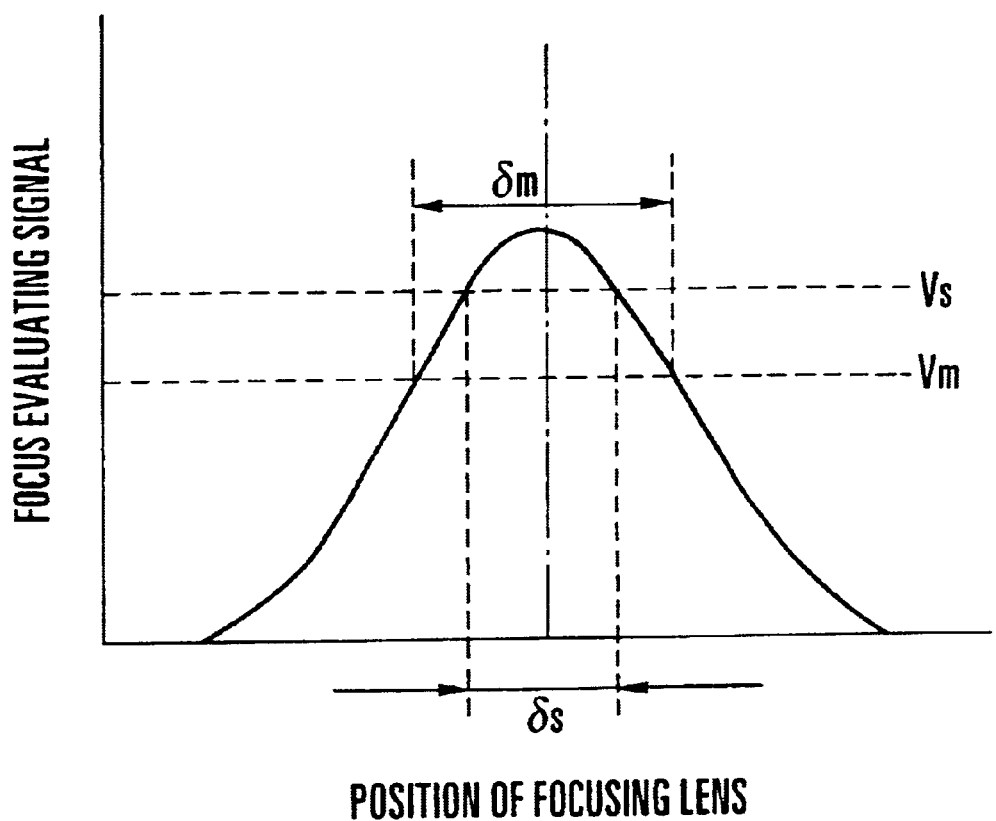
FIG. 10 is a graph showing the characteristic of a switching action of restart threshold values in a fourth embodiment of this invention through the relation of the position of a focusing lens to a focus evaluating signal.

A fourth embodiment of this invention is described with reference to FIG. 10 as follows. FIG. 10 shows the characteristic of a restart threshold value change-over action of the fourth embodiment through a relation between the position of the focusing lens and the focus evaluating signal. The arrangement of the fourth embodiment is basically similar to the arrangement of the first embodiment described with reference to FIGS. 3 and 4. In the case of the fourth embodiment, the restart threshold value to be used in one of the moving-image and still-image shooting modes is set beforehand differently from the value set for the other. When one of these shooting modes is selected by the mode selection switch 103 or 16, the system control block 101 or the control microcomputer 15 functions to instruct the restart setting block 109 to cause the focusing action carried out by using the restart threshold value corresponding to the selected mode.

The change-over of the restart threshold values is arranged to be made within the control microcomputer 15 which is shown in FIG. 4.

Referring to FIG. 10, in the case of the fourth embodiment, a restart threshold value Vm is set beforehand for the moving-image shooting mode and another restart threshold value Vs which is higher than the value Vm is also set beforehand for the still-image shooting mode. In the moving-image shooting mode, the focusing action is restarted when a focus evaluating signal becomes lower than the restart threshold value Vm. In the still-image shooting mode, the focusing action is restarted when the focus evaluating signal becomes lower than the restart threshold value Vs. Therefore, as shown in FIG. 10, an evaluation amount which corresponds to the maximum permissible amount of blur of the image of an object of shooting obtained on an image pickup plane is δs in the still-image shooting mode and δm in the moving-image shooting mode. The value δs is smaller than the value δm. Therefore, moving images are always picked up at an image quality level higher than the evaluation amount δm. Still images are always picked up at a high image quality level higher than the evaluation amount δs.

According to the arrangement of the fourth embodiment, the restart threshold values Vm and Vs are respectively set for the moving-image shooting mode and the still-image shooting mode. Therefore, the focusing action can be efficiently restarted appositely to each of the shooting modes. The images picked up in each of the shooting modes thus can be always obtained at an adequate image quality.

Further, the arrangement of this function is applicable also to all of the first, second and third embodiments described in the foregoing.

Fifth Embodiment

Figure 11:
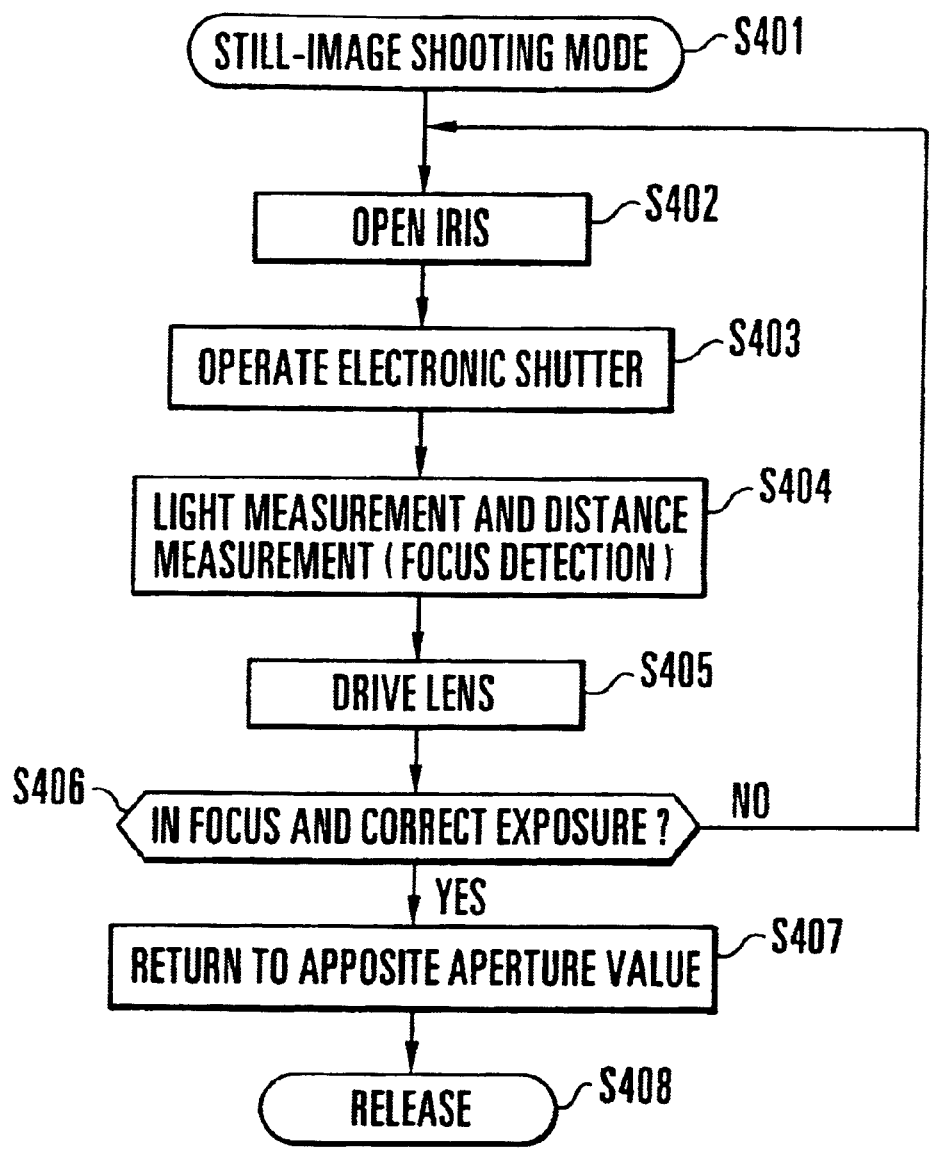
FIG. 11 is a flow chart showing a shooting operation performed in a fifth embodiment of this invention in a still-image shooting mode.

The following describes a fifth embodiment of this invention with reference to FIG. 11, which is a flow chart showing the shooting operation performed in the still-image shooting mode in the fifth embodiment.

The fifth embodiment is arranged basically in about the same manner as the arrangement of the first embodiment shown in FIG. 3. Therefore, referring also to FIG. 3, the system control circuit 101 is arranged to function in the still-image shooting mode as follows. The system control circuit 101 causes a focusing action to be carried out with the iris fully opened by controlling the exposure control block 104 (an exposure amount control circuit) which includes an electronic shutter. The iris is brought back to its position of a required aperture value after completion of the focusing action.

The flow of operation of the fifth embodiment is described with reference to the flow chart of FIG. 11 as follows. When the still-image shooting mode is set at a step S401, the flow comes to a step 402. At the step S402, the iris is set in the position of a full open aperture value in accordance with an instruction coming from the system control circuit 101. The flow then proceeds to a step S403. At the step S403, the electronic shutter is operated to effect an exposure. A focus evaluating signal is obtained by this exposure. At a step S404, the results of distance and light measuring actions are computed by using the focus evaluating signal obtained. The flow then comes to a step S405 to drive the focusing lens on the basis of data of a measured distance.

Next, when an in-focus state is confirmed at a step S406 after a series of distance measuring actions, the flow comes to a step S407. At the step S407, the aperture value of the iris is brought back to a value apposite to the shooting on the basis of data of light measurement. The flow then comes to a step S408 to make a shutter release for taking a shot of a still image. In the case of the still-image shooting, a distance measuring sensor is thus allowed to have a sufficient amount of exposure for the focusing action in the above-stated manner. By this arrangement, a sufficient output is obtained as the focus evaluating signal, so that the focusing action can be more accurately accomplished. Further, this embodiment allows the focusing action restart threshold value to be set in the same manner as in the case of the first to fourth embodiments described in the foregoing.

In the still-image shooting mode, as mentioned above, this embodiment sets the aperture value of the iris at a smaller value in performing the focusing action than in shooting or taking a shot. Therefore, the hill-like shape of the focus evaluating signal is narrowly formed to facilitate detection of the peak position of the focus evaluating signal. Further, with the aperture value set at a small value, the quantity of light incident on the image sensor increases to enhance the accuracy of setting an in-focus point.

The embodiment thus sets the iris at a full open position (a small aperture value) in performing the focusing action in the still-image shooting mode, so that an in-focus point can be accurately set by the focusing action. After completion of the focusing action, the iris is set at an aperture value apposite to shooting, so that a shot of a high-quality still image can be taken.

Further, exposure amount control means usable for the embodiment is not limited to an electronic shutter. A shutter of any other type is usable so long as the shutter is operable at a high shutter speed.

According to the arrangement of each of the first, second and third embodiments of this invention, the focusing action is restarted when the moving-image shooting mode is switched to the still-image shooting mode. A high frequency component of the video signal representing an object of shooting is detected as a focus evaluating signal. The focusing action is carried out by driving the image pickup system on the basis of the focus evaluating signal. In shooting a still image, therefore, the focusing action is always carried out at a high degree of accuracy before the image is picked up, so that the still image can be obtained with a high picture quality.

According to the arrangement of the fourth embodiment, the focusing action restart threshold value is changed from one value over to another according to the mode selected when selection is made between the moving-image shooting mode and the still-image shooting mode. When a high frequency component of the video signal representing an object of shooting which is detected as a focus evaluating signal becomes lower than the focusing action restart threshold value set by the change-over, the focusing action is restarted to be carried out again by driving the image pickup system. This arrangement enables the embodiment to efficiently restart the focusing action in a manner apposite to each of the shooting modes. Images thus can be picked up with a high picture quality in each of the different shooting modes.

Further, according to the arrangement of the fifth embodiment, when the shooting mode is switched over to the still-image shooting mode, the iris is set approximately at its full open aperture position in performing the focusing action in the still-image shooting mode. The exposure amount control means then makes an exposure with the iris aperture in the approximately full open state. After completion of the focusing action, a still image is picked up after the iris aperture is set at a required aperture value position, so that the still image can be picked up with a high picture quality on the basis of the highly accurate focusing action.

What is claimed is:

1. An image pickup apparatus capable of setting a moving-image shooting mode and a still-image shooting mode, comprising:

a) switching means for switching between the moving-image shooting mode and the still-image shooting mode;

b) focusing means for automatically adjusting a focus state in the moving-image shooting mode and still-image shooting mode; and c) control means for restarting said focusing means to execute a focus adjusting operation in response to a switching operation between the moving-image shooting mode and the still-image shooting mode by said switching means, wherein said control means is arranged to vary a characteristic of said focusing means correspondingly with the moving-image shooting mode or the still-image shooting mode, and wherein the characteristic of said focusing means to be varied by said control means is a threshold value which is set to be used for restarting said focusing means.

2. An image pickup apparatus capable of setting a moving-image shooting mode and a still-image shooting mode, comprising:

a) switching means for switching between the moving-image shooting mode and the still-image shooting mode;

b) focusing means for automatically adjusting focus state in the moving-image shooting mode and still-image shooting mode; and c) control means for restarting said focusing means to execute a focus adjusting operation in response to a switching operation between the moving-image shooting mode and the still-image shooting mode by said switching means, wherein said control means is arranged to vary a characteristic of said focusing means correspondingly with the moving-image shooting mode or the still-image shooting mode, and wherein the characteristic of said focusing means to be varied by said control means is a focus adjusting speed and a response characteristic and speed of an exposure control member.

3. A video camera apparatus capable of setting a moving-image shooting mode and a still-image shooting mode, comprising:

a) mode switching means for switching between the moving-image shooting mode and the still-image shooting mode;

b) focus adjusting means for adjusting controlling a focus condition in both of the shooting modes; and c) control means for restarting said focus adjusting means to execute a focus adjusting operation in response to a switching operation of said mode switching means between the moving-image shooting mode and the still-image shooting mode, wherein said control means is arranged to vary a characteristic of said focusing means correspondingly with the moving-image shooting mode or the still-image shooting mode, and wherein the characteristic of said focusing means to be varied by said control means is a threshold value which is set to be used for restarting said focusing means.

4. A video camera apparatus capable of setting a moving-image shooting mode and a still-image shooting mode, comprising:

a) mode switching means for switching between the moving-image shooting mode and the still-image shooting mode;

b) focus adjusting means for adjusting controlling a focus condition in both of the shooting modes; and c) control means for restarting said focus adjusting means to execute a focus adjusting operation in response to a switching operation of said mode switching means, wherein said control means is arranged to vary a characteristic of said focusing means correspondingly with the moving image shooting mode or the still-image shooting mode, and wherein the characteristic of said focusing means to be varied by said control means is a focus adjusting speed and a response characteristic and speed of an exposure control member.

5. An image pickup apparatus comprising:

a focusing device that performs a first focusing operation for a moving-image and a second focusing operation, which is capable of obtaining a sharper image than the first focusing operation by changing a threshold value for restarting focusing control, for a still-image; and a control device that switches between the first focusing operation and the second focusing operation.

6. An apparatus according to claim 5, further comprising:

an image pickup device that converts an optical image into an image signal, wherein said focusing device performs the first focusing operation and the second focusing operation with a high frequency component extracted from the image signal.

7. An apparatus according to claim 5, further comprising:

an image pickup device that converts an optical image into an image signal for photography, wherein said focusing device performs the first focusing operation and the second focusing operation with a high frequency component extracted from the image signal.

8. An apparatus according to claim 5, further comprising:

a image pickup device that converts an optical image into an image signal, wherein said focusing device performs the first focusing operation and the second focusing operation in a same manner by using a high frequency component extracted from the image signal.

9. An apparatus according to claim 5, further comprising:

a image pickup device that converts an optical image into an image signal for photography, wherein said focusing device performs the first focusing operation and the second focusing operation in a same manner by using a high frequency component extracted from the image signal.

10. An apparatus according to claim 5, wherein said control device switches from the first focusing operation to the second focusing operation in response to operating an operation member for starting a still-image shooting operation.

11. An apparatus according to claim 5, wherein said control device switches between the first focusing operation and the second focusing operation by switching between a moving-image shooting mode and a still-image shooting mode.

12. An apparatus according to claim 5, wherein said control device switches between the first focusing operation and the second focusing operation by switching between a moving-image shooting mode from a still-image shooting mode and operating an operation member for starting a still-image shooting operation.

13. An image pickup apparatus comprising:

a focusing device that performs a first focusing operation for a moving-image and a second focusing operation, which is capable of obtaining a sharper image than the first focusing operation by changing a threshold value for restarting focusing control, for a still-image; and a control device that starts the second focusing operation, regardless of a focusing state by the first focusing operation, by switching from a moving-image shooting mode to a still-image shooting mode.

14. An apparatus according to claim 13, wherein said control device starts the first focusing operation, in accordance with a focusing state by the second focusing operation, by switching from the still-image shooting mode to the moving-image shooting mode.

15. An apparatus according to claim 13, further comprising:

a image pickup device that converts an optical image into an image signal, wherein said focusing device performs the first focusing operation and the second focusing operation with a high frequency component extracted from the image signal.

16. An apparatus according to claim 13, wherein said control device switches from the first focusing operation to the second focusing operation in response to operating an operation member for starting a still-image shooting operation.

17. An apparatus according to claim 13, wherein said control device switches between the first focusing operation and the second focusing operation by switching between a moving-image shooting mode and a still-image shooting mode.

18. An apparatus according to claim 13, wherein said control device switches between the first focusing operation and the second focusing operation by switching between a moving-image shooting mode from a still-image shooting mode and operating an operation member for starting a still-image shooting operation.

19. An image pickup apparatus comprising:
   a focusing device that performs a first focusing operation for a moving-image and a second focusing operation, which is capable of obtaining a sharper image than the first focusing operation by changing a threshold value for restarting focusing control, for a still-image; and
   a control device that starts the first focusing operation, in accordance with a focusing state by the second focusing operation, by switching from a still-image shooting mode to a moving-image shooting mode.

20. An apparatus according to claim 19, further comprising:
   a image pickup device that converts an optical image into an image signal,
   wherein said focusing device performs the first focusing operation and the second focusing operation with a high frequency component extracted from the image signal.

21. An apparatus according to claim 19, wherein said control device switches from the first focusing operation to the second focusing operation in response to operating an operation member for starting a still-image shooting operation.

22. An apparatus according to claim 19, wherein said control device switches between the first focusing operation and the second focusing operation by switching between a moving-image shooting mode and a still-image shooting mode.

23. An apparatus according to claim 19, wherein said control device switches between the first focusing operation and the second focusing operation by switching between a moving-image shooting mode from a still-image shooting mode and operating an operation member for starting a still-image shooting operation.

24. An image pickup apparatus comprising:
   a switching device that switches between a moving-image pickup mode and a still-image pickup mode; and
   a control device that performs an operation for focusing obtaining a higher in-focus degree in said still-image pickup mode than in said moving-image pickup mode by changing a threshold value for restarting focusing control, in response to being changed from said moving-image pickup mode to said still-image pickup mode by said switching device.

25. An image pickup apparatus according to claim 24, further comprising:
   an image pickup device that converts an optical image into an image signal,
   wherein said control device performs the operation for focusing in said moving-image pickup mode and still-image pickup mode with a high frequency component extracted from the image signal.

26. An image pickup apparatus according to claim 24, further comprising:
   an image pickup device that converts an optical image into an image signal for photography,
   wherein said control device performs the operation for focusing in said moving-image pickup mode and still-image pickup mode with a high frequency component extracted from the image signal.

27. An image pickup apparatus according to claim 24, further comprising:
   an image pickup device that converts an optical image into an image signal,
   wherein said control device performs the operation for focusing in said moving-image pickup mode and still-image pickup mode in a same manner by using a high frequency component extracted from the image signal.

28. An image pickup apparatus according to claim 24, further comprising:
   an image pickup device that converts an optical image into an image signal for photography,
   wherein said control device performs the operation for focusing in said moving-image pickup mode and still-image pickup mode in a same manner by using a high frequency component extracted from the image signal.

29. An image pickup apparatus according to claim 24, wherein said control device starts the operation for focusing in response to being changed from said moving-image pickup mode to said still-image pickup mode by said changing device, regardless of a focusing state in said moving-image pickup mode.

30. An image pickup apparatus according to claim 24, wherein said control device restarts the operation for focusing in response to being changed from said moving-image pickup mode to said still-image pickup mode by said changing device.

31. An image pickup apparatus according to claim 24, wherein said control device changes an evaluation value for focusing for said moving-image pickup mode to an evaluation value for focusing for said still-image pickup mode in response to being changed from said moving-image pickup mode to said still-image pickup mode by said changing device.

32. An image pickup apparatus comprising:
   a switching device that switches between a moving-image pickup mode and a still-image pickup mode; and
   a control device that changes a threshold value for restarting focusing control for said moving-image pickup mode to an evaluation value for focusing for said still-image pickup mode in response to being changed from said moving-image pickup mode to said still-image pickup mode by said changing device.

33. An image pickup apparatus according to claim 32, further comprising:
   an image pickup device that converts an optical image into an image signal,
   wherein said control device performs the operation for focusing in said moving-image pickup and still-image pickup mode with a high frequency component extracted from the image signal.

34. An image pickup apparatus according to claim 32, further comprising:
   an image pickup device that converts an optical image into an image signal for photography, wherein said control device performs the operation for focusing in said moving-image pickup mode and still-image pickup mode with a high frequency component extracted from the image signal.

35. An image pickup apparatus according to claim 32, further comprising:

image pickup device that converts an optical image into an image signal, wherein said control device performs the operation for focusing in said moving-image pickup mode and still-image pickup mode in a same manner by using a high frequency component extracted from the image signal.

36. An image pickup apparatus according to claim 32, further comprising:

an image pickup device that converts an optical image into an image signal for photography, wherein said control device performs the operation for focusing in said moving-image pickup mode and still-image pickup mode in a same manner by using a high frequency component extracted from the image signal.

37. An image pickup apparatus according to claim 32, wherein said control device starts the operation for focusing in response to being changed from said moving-image pickup mode to said still-image pickup mode by said changing device, regardless of a focusing state in said moving-image pickup mode.

38. An image pickup apparatus according to claim 32, wherein said control device restarts the operation for focusing in response to being changed from said moving-image pickup mode to said still-image pickup mode by said changing device.

* * * * *

UNITED STATES PATENT AND TRADEMARK OFFICE
CERTIFICATE OF CORRECTION

PATENT NO. : 6,727,949 B1  
DATED : April 27, 2004  
INVENTOR(S) : Hiroshi Saruwatari et al.

It is certified that error appears in the above-identified patent and that said Letters Patent is hereby corrected as shown below:

<u>Column 6,</u>  
Line 32, delete "as follows:" and insert -- as follows. --.

<u>Column 10,</u>  
Line 45, delete "step S11" and insert -- step S110 --.  
Lines 54 and 60, delete "step Sill" and insert -- step S111 --.

Signed and Sealed this

Fourth Day of April, 2006

JON W. DUDAS  
*Director of the United States Patent and Trademark Office*